(12) United States Patent
Spagnoli et al.

(10) Patent No.: US 6,855,884 B2
(45) Date of Patent: Feb. 15, 2005

(54) PROTECTION MEMBER FOR A MESH CABLE TRAY, AND A TRAY INCLUDING SAID MEMBER

(75) Inventors: Gian Piero Spagnoli, Arcisate (IT); Alan Finco, Spinetta Marengo (IT)

(73) Assignee: Legrand S.p.A., Milan (IT)

( * ) Notice: Subject to any disclaimer, the term of this patent is extended or adjusted under 35 U.S.C. 154(b) by 0 days.

(21) Appl. No.: 10/263,675

(22) Filed: Oct. 4, 2002

(65) Prior Publication Data

US 2004/0065459 A1 Apr. 8, 2004

(51) Int. Cl.⁷ ................................................ H02G 3/04
(52) U.S. Cl. ........................ 174/48; 174/49; 174/100; 211/181
(58) Field of Search ................... 174/48, 100, 49, 174/135, 68.1, 68.3; 248/49, 175, 302; 211/181

(56) References Cited

U.S. PATENT DOCUMENTS

| | | | | |
|---|---|---|---|---|
| 5,531,410 A | * | 7/1996 | Simon | 248/49 |
| 5,927,658 A | * | 7/1999 | Gerster | 248/49 |
| 6,023,024 A | * | 2/2000 | Stjerneby | 174/95 |
| 6,138,961 A | * | 10/2000 | Zweig | 248/68.1 |
| 6,402,418 B1 | * | 6/2002 | Durin et al. | 403/329 |

FOREIGN PATENT DOCUMENTS

| | | |
|---|---|---|
| EP | 1 206 022 A1 | 5/2002 |
| FR | 2706 973 A1 | 12/1994 |
| FR | 2 723 270 A1 | 2/1996 |

* cited by examiner

Primary Examiner—Dhiru R Patel
(74) Attorney, Agent, or Firm—Sughrue Mion, PLLC

(57) ABSTRACT

A mesh cable tray comprises a series of longitudinal wires and a series of transverse wires connected to one another at nodes to form a grid, in which each transverse wire includes a base portion from which two parallel arms extend transversely relative to the base portion so that each transverse wire is generally U-shaped. The series of longitudinal wires comprises a pair of longitudinal edge wires which are disposed beside free ends of the parallel arms of the U-shaped transverse wires. The tray has protection members arranged in the regions of the nodes at which the longitudinal edge wires and the parallel arms of the U-shaped transverse wires intersect, in order to cover the free ends of the parallel arms.

18 Claims, 13 Drawing Sheets

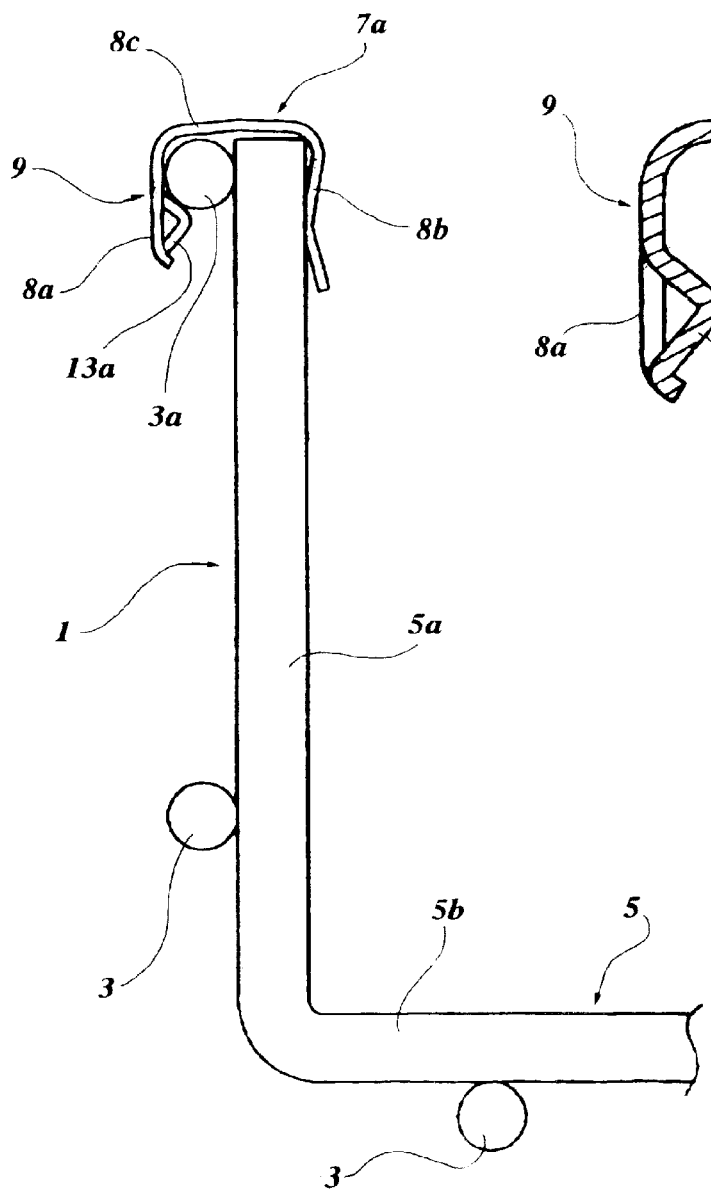
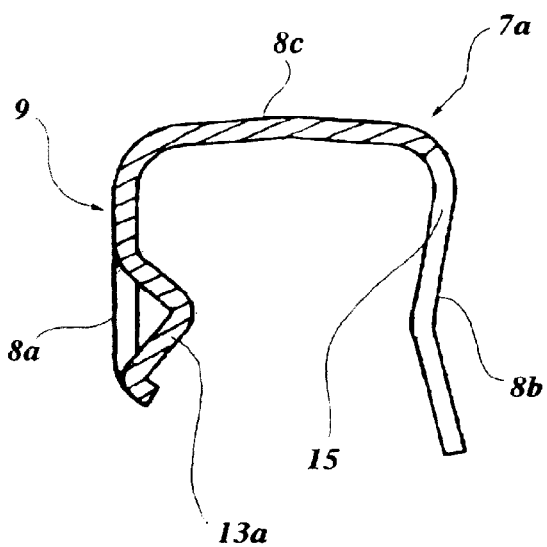

Fig. 15
Fig. 16
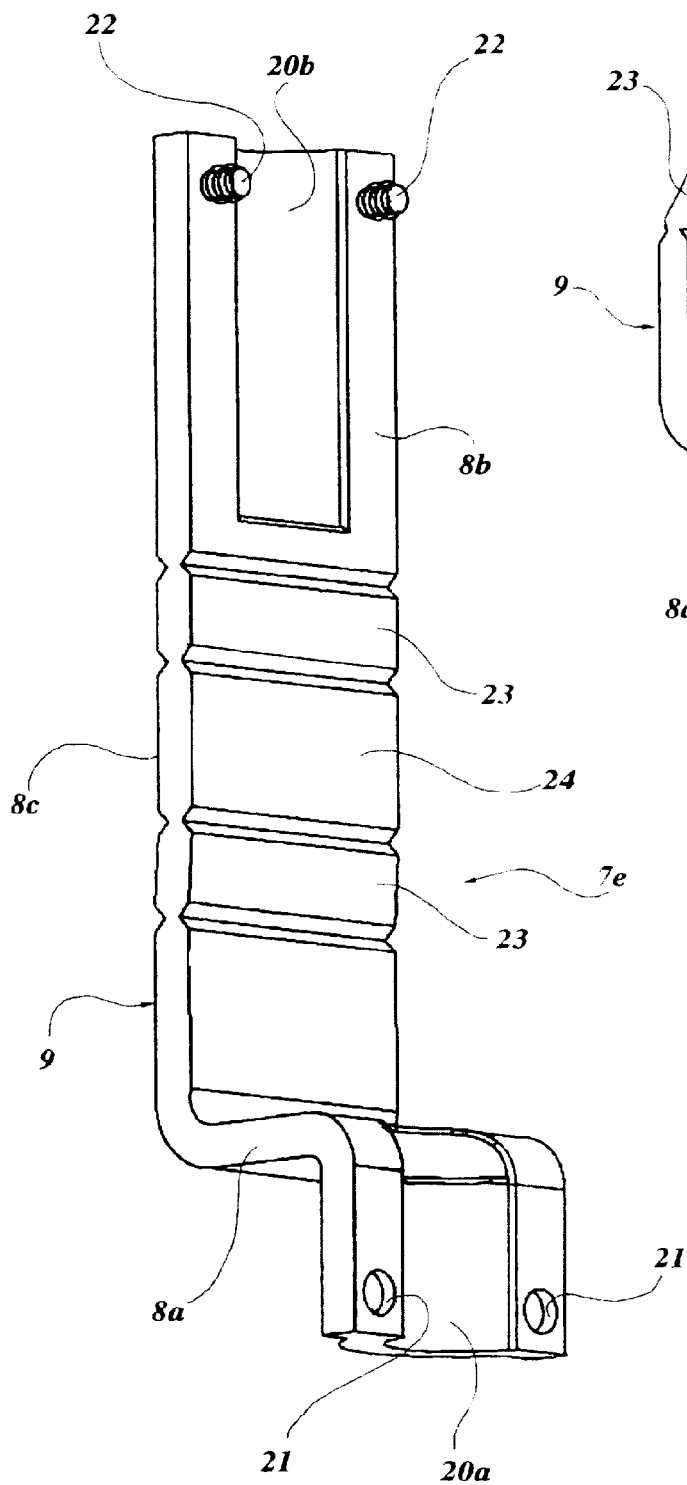
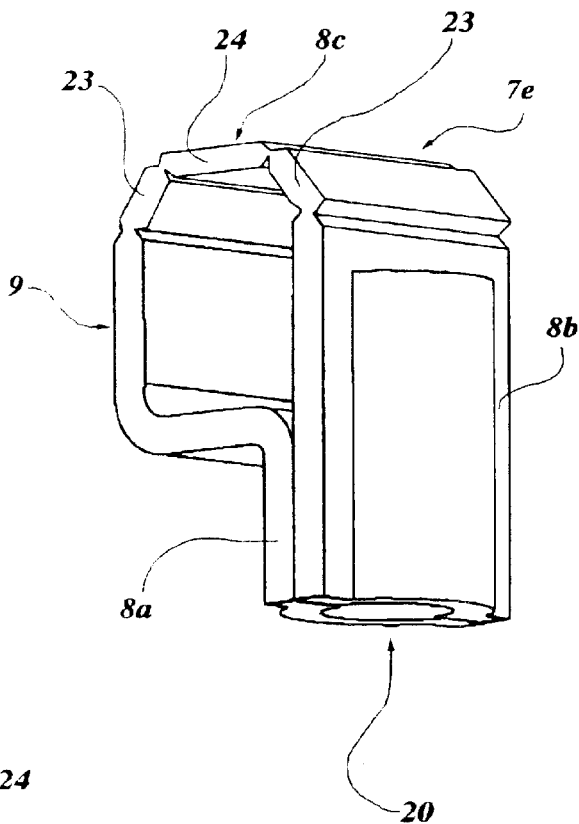

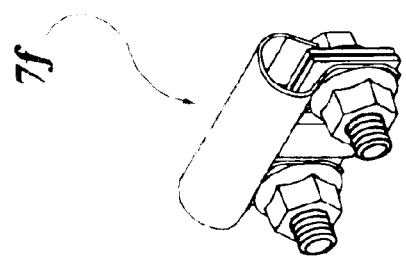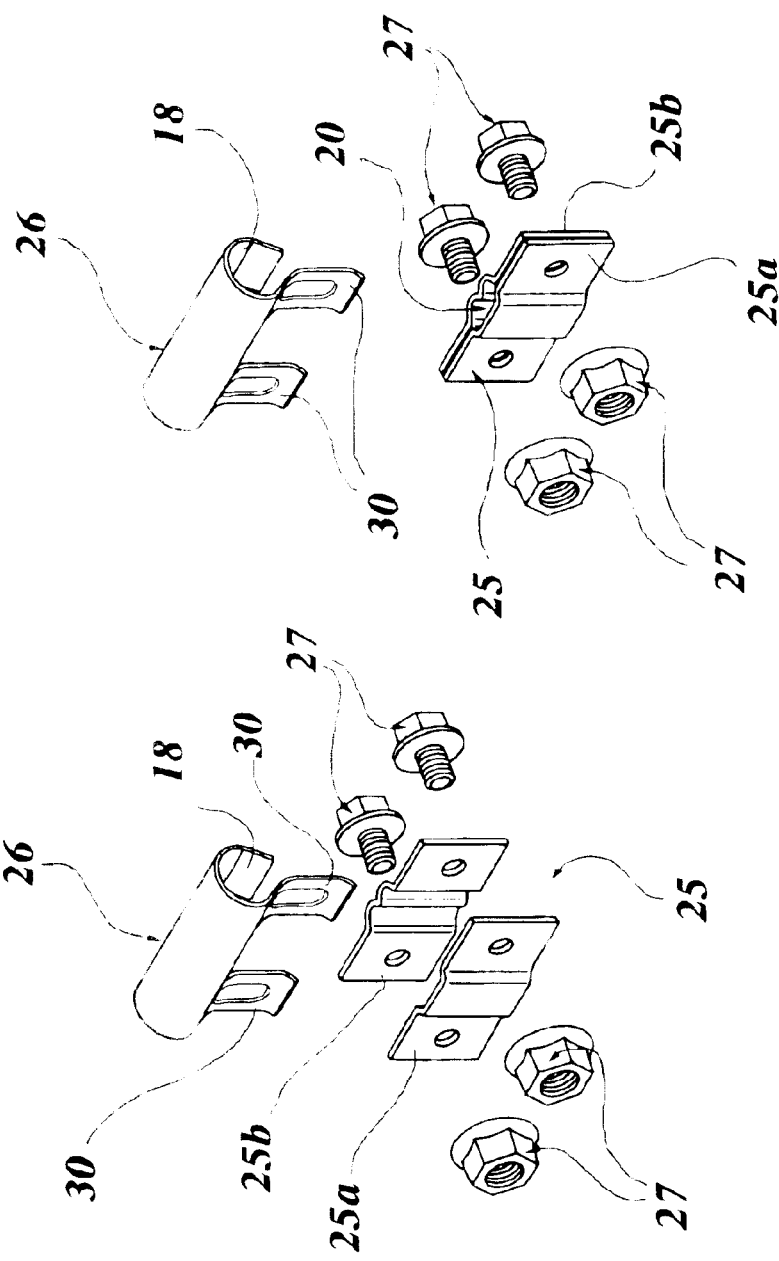

PROTECTION MEMBER FOR A MESH CABLE TRAY, AND A TRAY INCLUDING SAID MEMBER

FIELD OF THE INVENTION

The present invention relates to cable trays comprising a series of longitudinal wires and a series of transverse wires, connected to one another at nodes to form a grid, in which each transverse wire includes a base portion from which two parallel arms extend transversely relative to the base portion, so that each transverse wire is generally U-shaped, the series of longitudinal wires comprising a pair of longitudinal edge wires which are disposed beside free ends of the parallel arms of the U-shaped transverse wires.

BACKGROUND OF THE INVENTION

In cable trays of the type defined above, the free ends of the parallel arms of the U-shaped transverse wires are generally trimmed in a plane transverse their general axes so that they have circular sharp edges. Owing to the presence of these sharp edges, the insulating covering of the electrical cables to be disposed in the tray may be damaged during their insertion in the tray and the operators handling the cables of the tray may be injured.

Various measures have been proposed for solving the above-mentioned problems and consist, in summary, in rounding off the free ends of the parallel arms of the U-shaped transverse wires, in butt-welding the longitudinal edge wires to the free ends of the arms of the U-shaped transverse wires, or in bending these ends.

However, these measures have been found disadvantageous because they require additional operations which necessarily have to be performed during the production of the various sections of the tray and which thus render their fabrication too expensive. Moreover, in some cases, these measures lead to a change in the structure of the tray which renders it less suitable for being bent to produce curved tray sections.

SUMMARY OF THE INVENTION

To prevent the problems of the prior art, the subject of the invention is a protection member for a cable tray which comprises a series of longitudinal wires and a series of transverse wires connected to one another at nodes to form a grid, in which each transverse wire includes a base portion from which two parallel arms extend transversely relative to the base portion, so that each transverse wire is generally U-shaped, the series of longitudinal wires comprising a pair of longitudinal edge wires which are disposed beside free ends of the parallel arms of the U-shaped transverse wires, characterized in that it is arranged for being placed in the region of at least one of the nodes at which the longitudinal edge wires and the parallel arms of the U-shaped transverse wires of the tray intersect, in order to cover the free ends of the parallel arms.

A further subject of the invention is a cable tray according to the claims.

This solution provides a cable tray which has a conventional basic structure on which auxiliary protection members are subsequently fitted in the regions of the above-mentioned nodes, which do not bring about changes in the structure of the tray and can be associated with the tray quickly and conveniently, leading to an entirely negligible increase in costs. In general, the auxiliary protection members can be arranged on any conventional basic mesh cable-tray structure, even after its installation.

According to a preferred characteristic of the invention, each protection member has a shaped outer surface for permitting the snap-engagement of a bent edge portion of a cover for closing the tray.

BRIEF DESCRIPTION OF THE DRAWINGS

Further characteristics and advantages of the invention will become clearer from the following detailed description, provided purely by way of non-limiting example with reference to the appended drawings, in which:

FIG. 5 is an elevational view showing a detail indicated by the arrow V of FIG. 3, on an enlarged scale, FIG. 6 is an elevational view showing a detail of FIG. 3, sectioned along the line VI—VI, on an enlarged scale, FIGS. 15 and 16 are two perspective views of a further variant of the invention, in a extended condition prior to mounting and in the closed configuration in which it is mounted on the tray, respectively, FIGS. 17a, 17b and 17c are an exploded, perspective view, a partially exploded view, and a view in the mounted configuration, respectively, of yet another variant of the second embodiment of the invention.

DETAILED DESCRIPTION OF THE PREFERRED EMBODIMENTS

Figure 1:
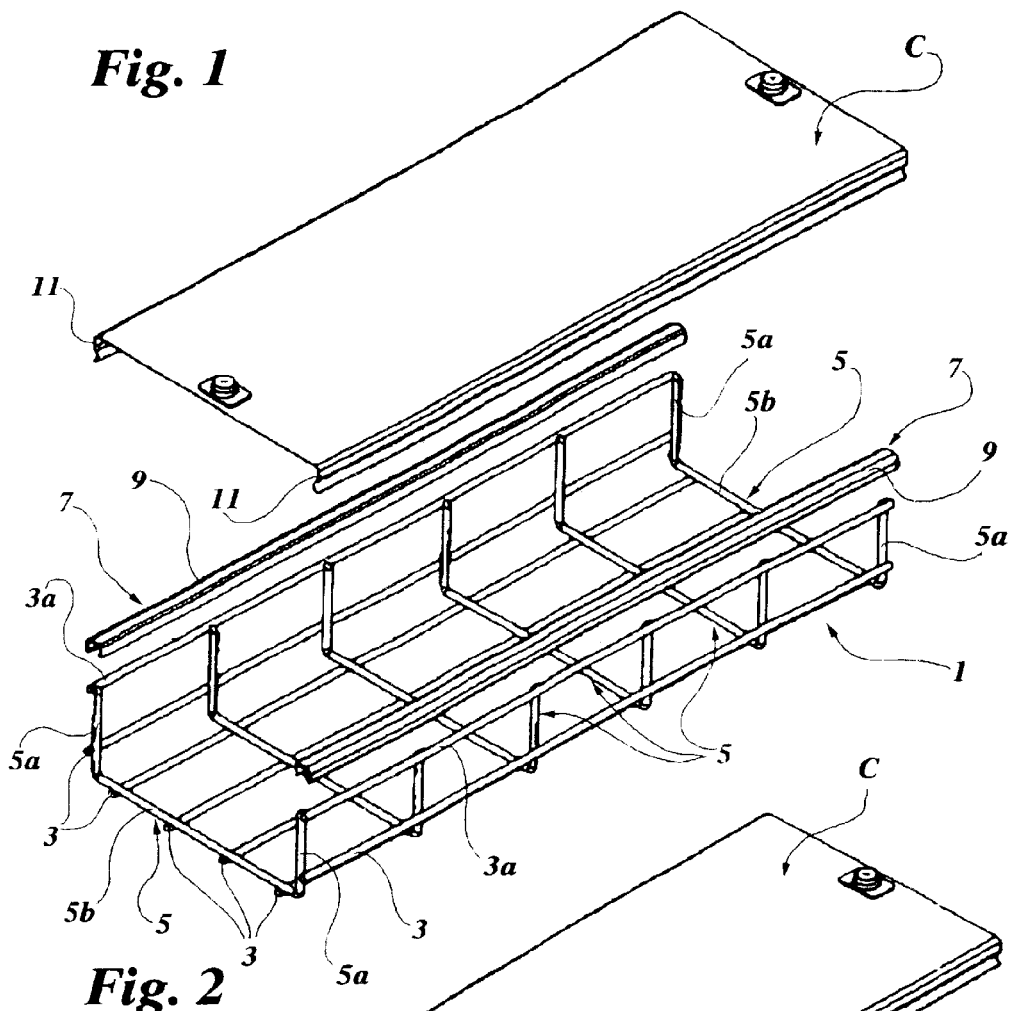
FIG. 1 is an exploded, perspective view of a first embodiment of a cable tray according to the invention.
Figure 2:
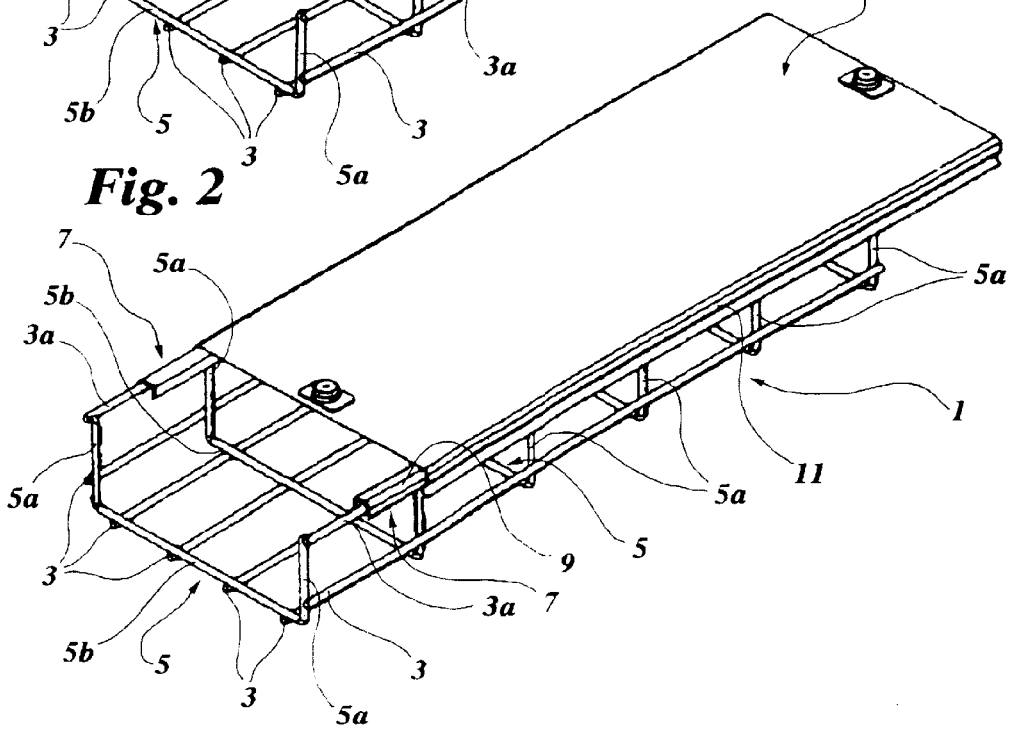
FIG. 2 is a view similar to that of FIG. 1, showing the tray of the previous drawing in its assembled condition.
Figure 3:
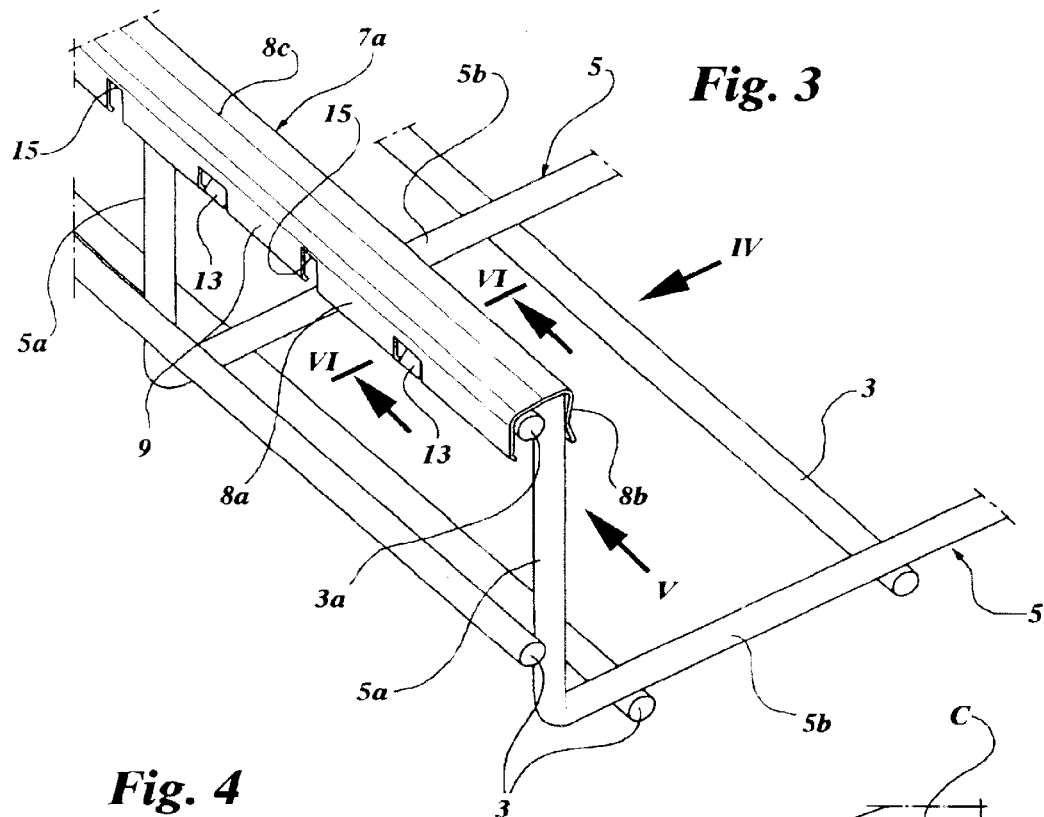
FIG. 3 is a partial perspective view of a variant of the tray of FIG. 1.
Figure 4:
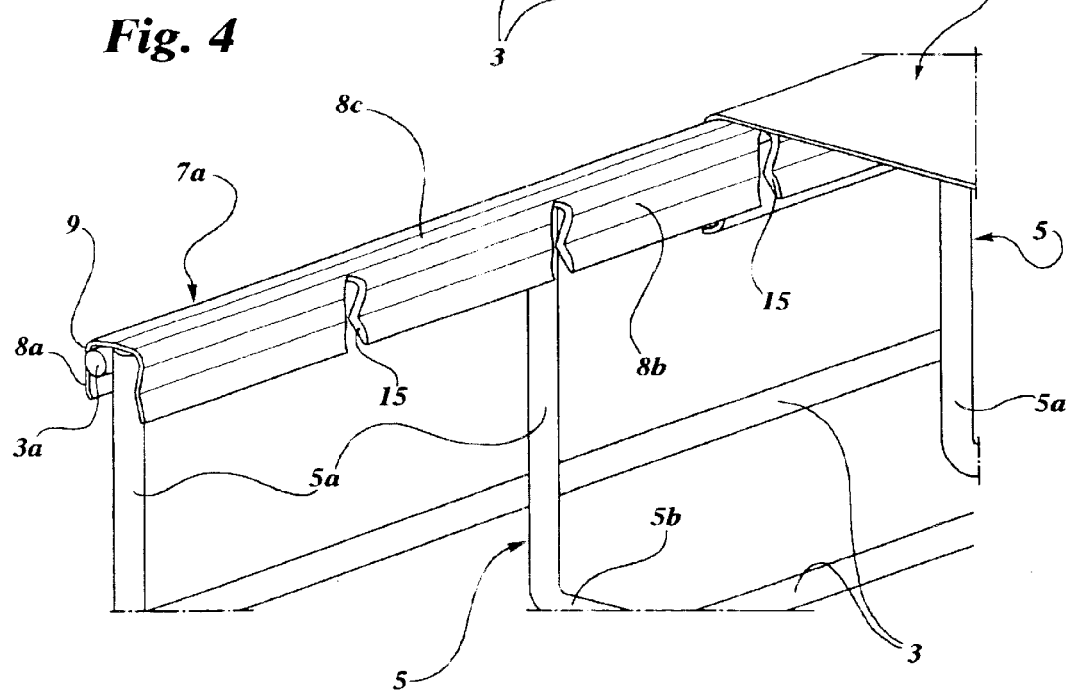
FIG. 4 is a perspective view of the tray of FIG. 3 from the side indicated by the arrow IV.

With initial reference to FIGS. 1 and 2, a cable tray 1 of the type generally known as a "mesh" tray comprises a series of longitudinal metal wires 3, 3a and a series of transverse metal wires 5, connected to one another, for example, by electrical welding at nodes to form a grid.

Each of the transverse wires 5 includes a normally straight base portion 5b from which a pair of parallel arms 5a extend transversely relative to the base portion 5b so that each transverse wire 5 is generally U-shaped. The longitudinal wires disposed on the outer sides of the free ends of the parallel arms 5a of the transverse wires 5 are referred to below as "longitudinal edge wires", and are indicated 3a in the drawings.

In the region of the longitudinal edge wires 3a, the tray 1 has a pair of channel-shaped, profiled protection elements 7 of uniform cross-section, each of which may have a length equal to one section of cable tray. The elements 7 primarily perform the function of covering the free ends of the parallel arms 5a to prevent the cables which are to be housed in the tray 1 from being damaged during insertion in the tray 1 or removal therefrom and to prevent injury to the operators handling the cables.

The profiled elements 7 are preferably made of plastics and, in this case, may be connected in the region of the longitudinal edge wires 3a by any known connection means, for example, by snap-engagement.

Each of the elements 7 preferably has a lateral flange, usually the flange which is to be disposed towards the outside of the tray 1, which has a shaped surface 9 of a shape and extent corresponding to those of a bent edge portion 11 of a cover C of the tray, so that the cover C can be snap-engaged onto the pair of profiled elements 7 of each section of tray 1.

According to a variant of the invention shown in FIGS. 3 to 6, in which elements identical or similar to those of the previous variant are indicated by the same reference numerals, the profiled protection elements are indicated 7a. In the embodiment shown, they are preferably made of metal and connected in the region of the longitudinal edge wires 3a by snap-engagement or by electrical welding. These profiled elements are also channel-shaped, each one being constituted by an elongate, substantially flat central portion 8c from which a pair of substantially parallel, opposed flanges 8a and 8b extend. The flange 8a in particular is intended to face outwardly relative to the tray 1 in the mounted condition and advantageously has the surface 9 for the snap-engagement of a respective bent edge 11 of a cover C.

The flange 8a has a series of uniformly-spaced openings in each of which a respective V-shaped clip 13 is defined, the clip being formed so as to be resiliently deformable so that the profiled element 7a can be snap-engaged onto the longitudinal edge wires 3a.

Both the flange 8a and the opposite flange 8b advantageously have respective series of transverse slots 15 spaced uniformly axially along the profiled element 7a to constitute areas of weakening of the profiled element 7a for facilitating its separation into sections shorter than the length in which each profiled element 7a is originally produced.

FIGS. 7 to 20 show some variants of another embodiment of the invention according to which the elements for protecting the free ends of the arms 5a of the U-shaped transverse wires 5 are constituted by discrete elements rather than continuous elements, the same reference numerals as in the previous drawings being used to indicate identical or similar elements in these drawings.

Figure 7:
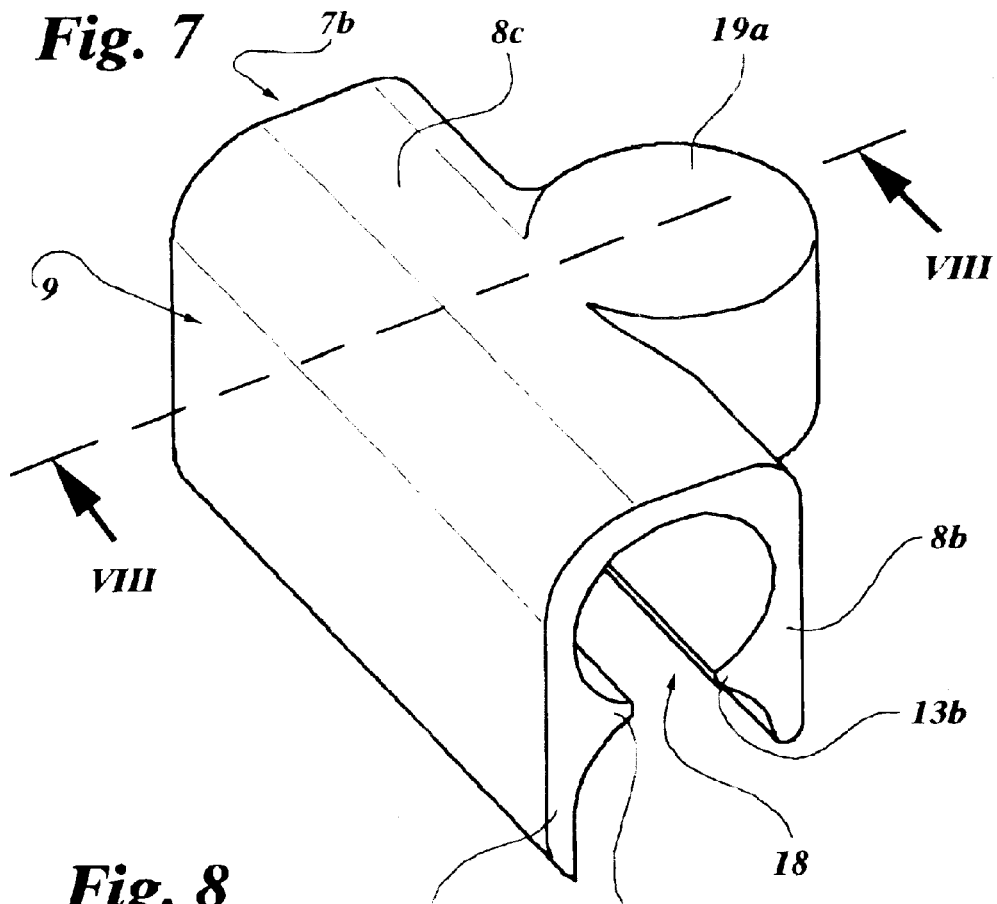
FIG. 7 is a perspective view of a first variant of a second embodiment of the invention.
Figure 8:
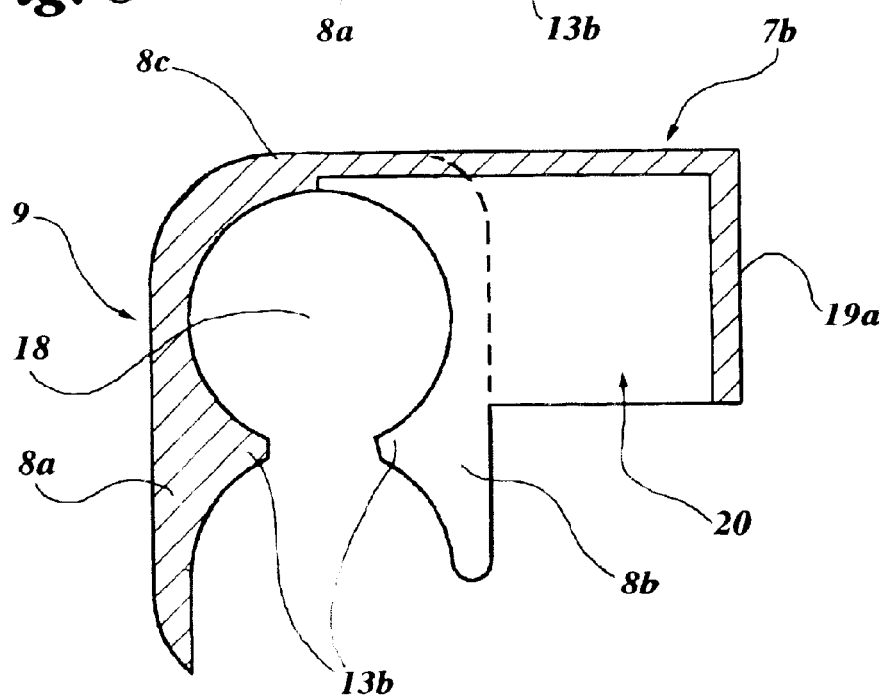
FIG. 8 is an elevational view sectioned on the line VIII—VIII of FIG. 7.
Figure 9:
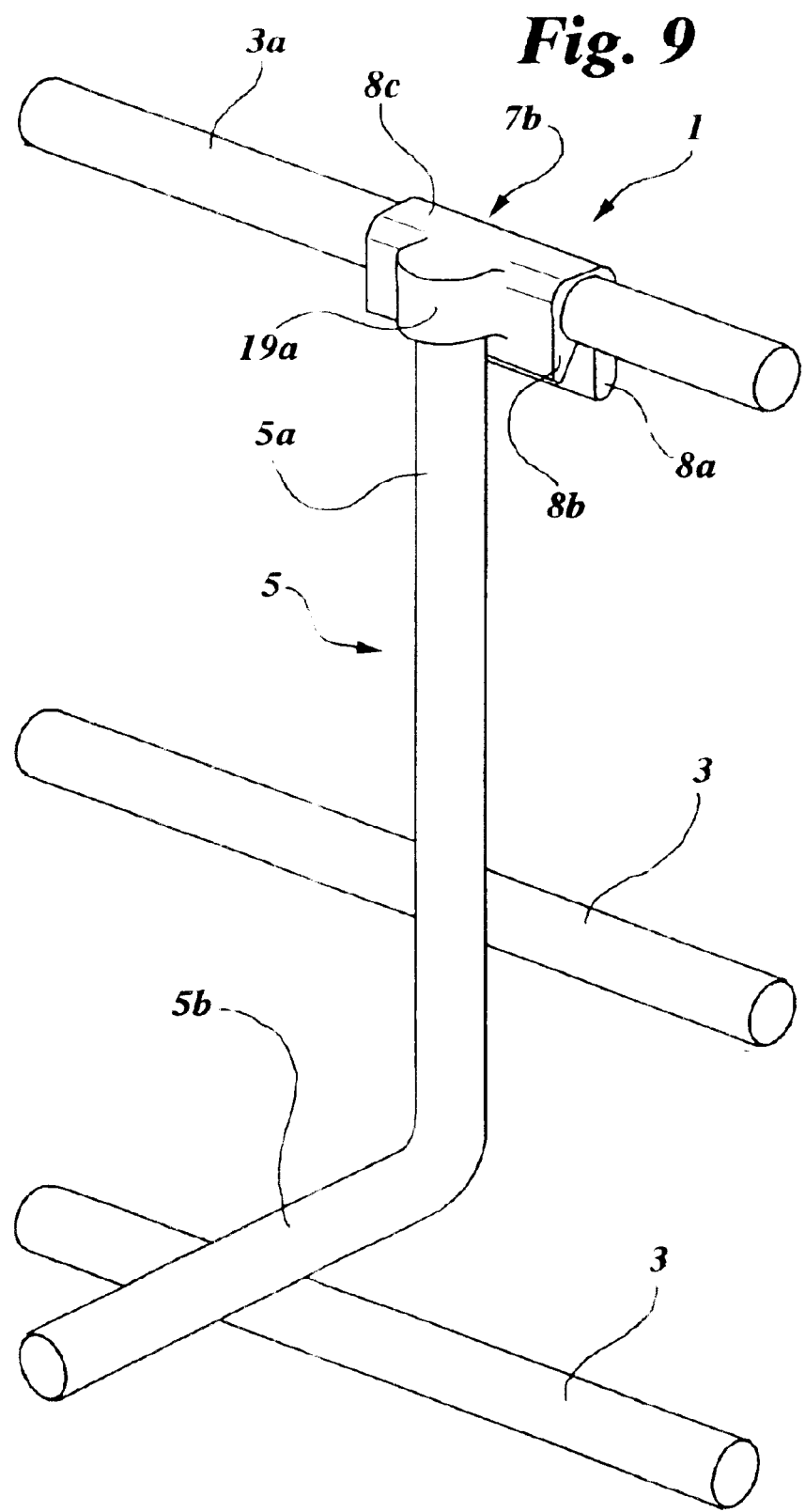
FIG. 9 is a perspective view which shows the insert of FIGS. 7 and 8 in the fitted condition.

In FIGS. 7 to 9, an insert is indicated 7b, which is intended to be positioned in the region of a node of the tray 1 at which at least one arm 5a of a U-shaped transverse wire 5 and at least one longitudinal edge wire 3a intersect. The insert 7b comprises a channel-shaped portion which is intended to extend around an axial portion of at least one longitudinal edge wire 3a, this channel-shaped portion including a substantially flat base wall 8c from which a pair of substantially parallel, opposed flanges 8a, 8b extend transversely. A cylindrical cavity 18 is defined between the flanges 8a and 8b and it has its axis parallel to these flanges and its shape corresponds to the cross-section of the longitudinal edge wires 3a. The cavity 18 has an opening which faces away from the wall 8c, and through which at least one wire 3a can be introduced, the opening being defined by a pair of pointed appendages 13b, the tips of which are spaced apart by a distance less than the diameter of the cavity 18. A hollow element 19a extends on one side of the flange 8b and defines a seat 20 for housing the free end of an arm 5a of at least one U-shaped transverse wire 5.

The flange 8a defines a surface 9 to be engaged by the bent edge 11 of a cover C of the tray 1.

The insert 7b is preferably formed by moulding of plastics material so that the flanges 8a and 8b are resiliently deformable to a limited extent relative to the wall 8c. When the insert has been positioned over a longitudinal edge wire 3a, the application of pressure from the side of the wall 8c thus causes the flanges 8a and 8b to open out, consequently moving the appendages 13b apart to allow the longitudinal wire 3a to pass between them and to be engaged in the cylindrical seat 18. The resilient return of the appendages 13b to the undeformed condition, and of the flanges 8a and 8b therewith, enables the insert 7b to be snap-retained on the respective wires 3a.

Although FIGS. 7 to 9 show, by way of example, an insert 7b in which the seat 20 of the element 19a can house the end of only one arm 5a, of course, the seat 20 may be shaped so as to house two arms 5a disposed side by side if the insert 7b is intended not only for protecting their free ends but also for holding together the corresponding ends of two adjacent sections of the tray 1.

Figure 10:
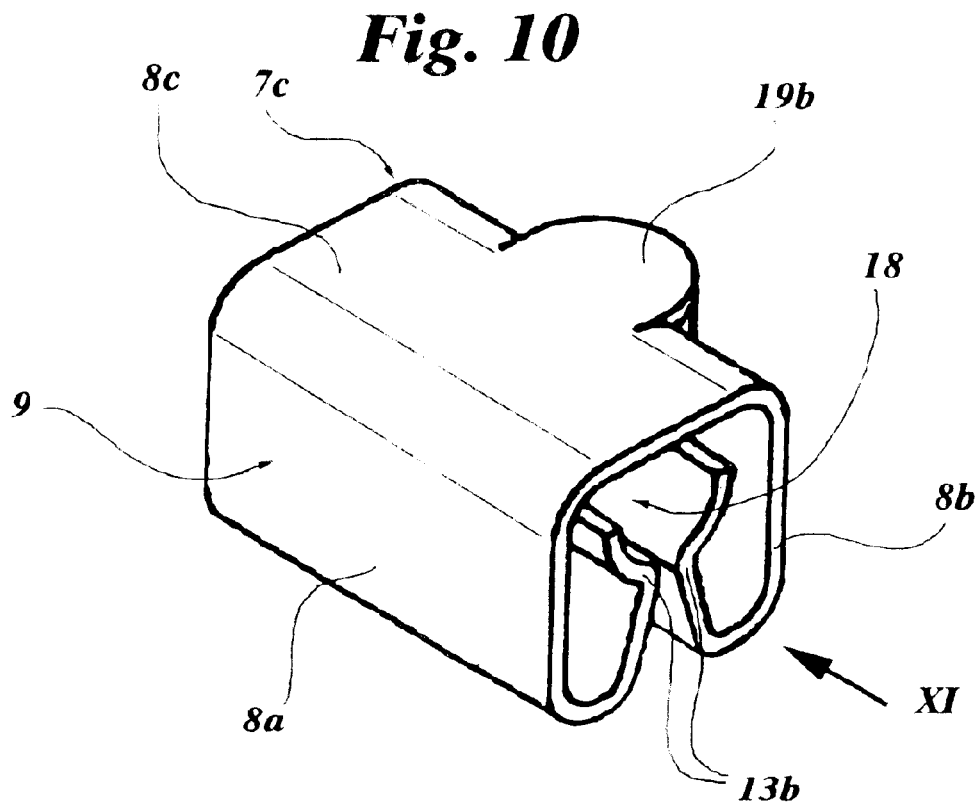
FIG. 10 is a perspective view of another variant of the second embodiment of the invention.
Figure 11:
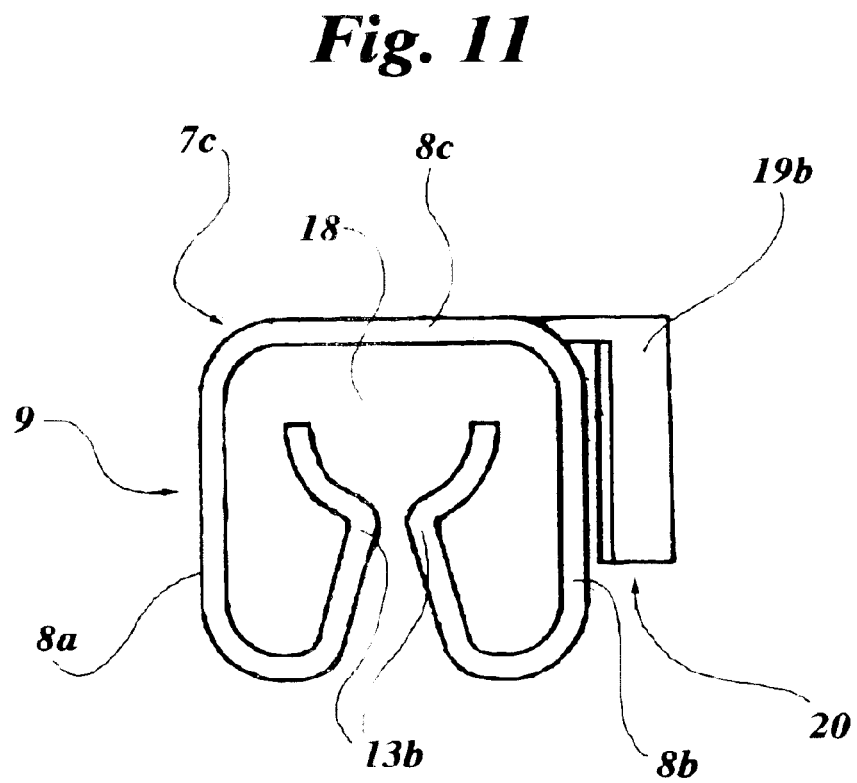
FIG. 11 is an elevational view of the insert of FIG. 10 from the side indicated by the arrow XI.
Figure 12:
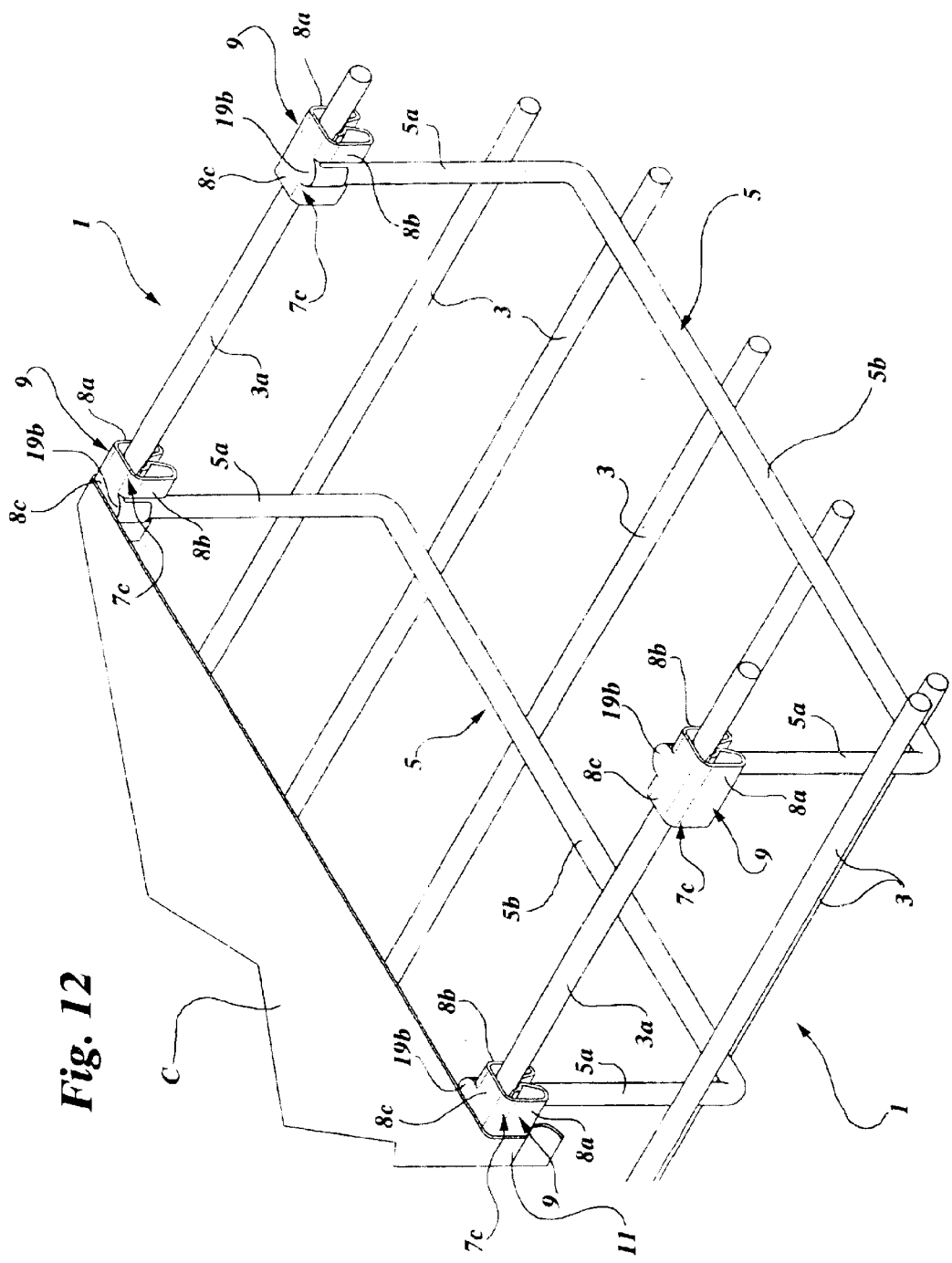
FIG. 12 is a perspective view which shows a plurality of inserts according to the variant of FIGS. 10 and 11, in the fitted condition.

FIGS. 10 to 12 show another variant of the above-mentioned insert, in this case indicated 7c. The insert 7c is produced as a result of blanking and bending operations performed on a metal plate in a manner such that the insert 7c has a pair of opposed flanges 8a and 8b connected by an intermediate flat wall 8c.

A respective resiliently-deformable, shaped clip 13b extends from each of the flanges 8a, 8b inside the insert 7c, the two clips 13b being shaped in a manner such that an elongate seat 18 for housing at least one longitudinal edge wire 3a is defined between the clips 13b and the wall 8c. A projecting body 19b extends from the flange 8b and a seat 20 defined therein is shaped so as to house at least one end of an arm 5a of a respective U-shaped transverse wire 5.

In this variant also, the flange 8a advantageously defines a surface 9 for engagement by an edge 11 of a cover C.

Alternatively, the metal insert 7c may be shaped so as to define rigidly the seat 18 for receiving the longitudinal edge wire 3a, and may be fixed thereto by electrical welding.

Figure 13:
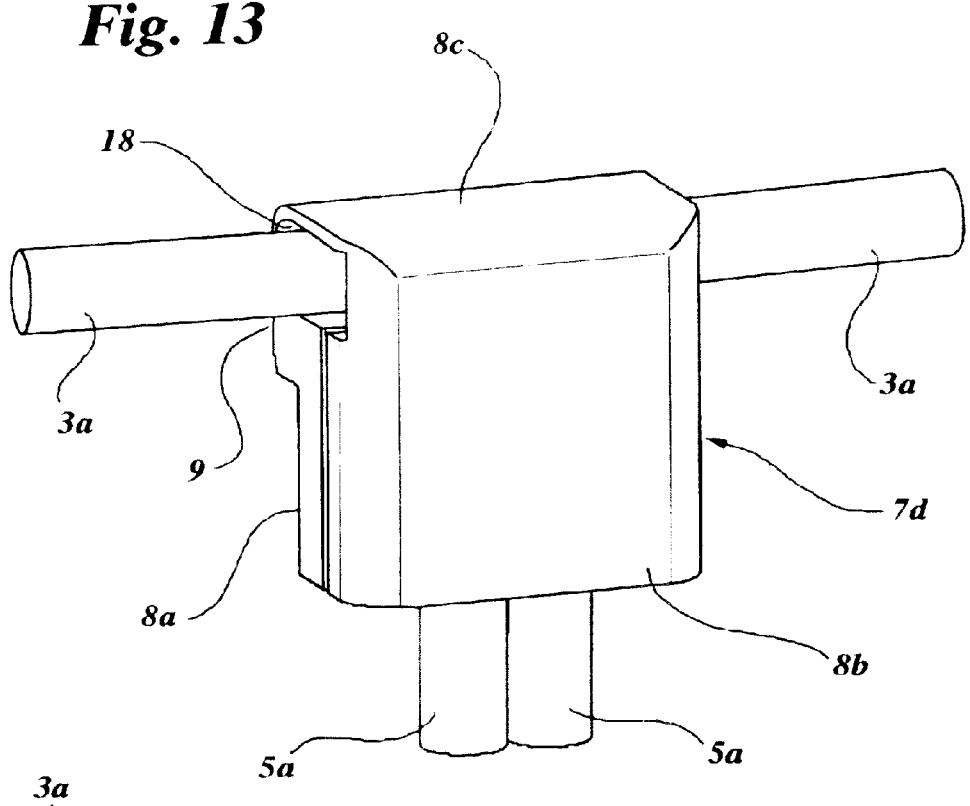
FIGS. 13 and 14 are two perspective views of another variant of the second embodiment of the invention.
Figure 14:
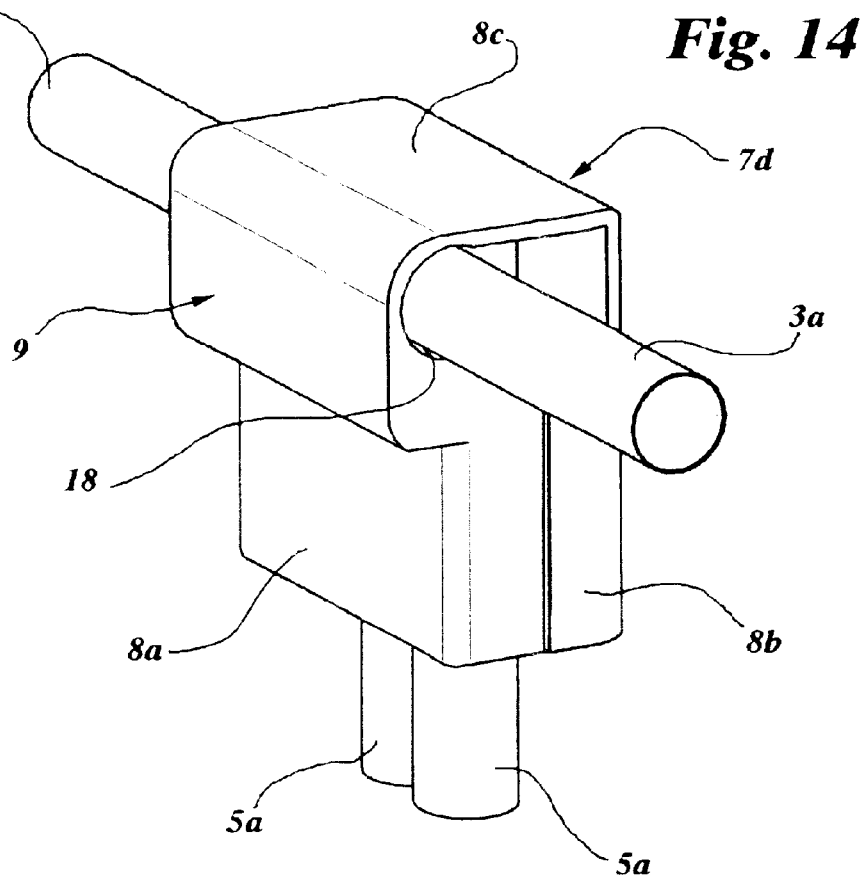

Another variant of the insert of the invention is shown in FIGS. 13 and 14 in which it is indicated 7d. The insert 7d is made of moulded plastics material and its flanges 8a and 8b are formed as a pair of half-shells connected to one another in the region of a central zone of the wall 8c which is preferably thin so as to be deformable at least to a limited extent. The two half-shells 8a and 8b can thus be moulded in the open condition and can subsequently be brought together by bending of the wall 8c, for example, in the region of a predefined bending line so as to adopt the assembled condition shown in FIGS. 13 and 14. The insert 7d shown in these drawings is particularly suitable for interconnecting the ends of two sections of tray 1 disposed adjacent one another or two portions of the same section of tray after some lateral portions of the wires 3, 3a have been removed from one of its sides to enable the tray section to be bent, in known manner, to cause it to adopt a curved configuration.

The half-shells 8a and 8b preferably have snap-coupling means (not visible in the drawings) so as to be connected rigidly in their assembled condition as a result of being brought together.

FIGS. 15 and 16 show a further variant of the insert according to the invention, indicated 7e. The insert 7e, which is also preferably made of moulded plastics material, is initially formed as an elongate plate which comprises a pair of opposed flanges or end portions 8a and 8b. The portion 8a is substantially S-shaped and the portion 8b is substantially straight, both of these portions having respective semicylindrical seats 20a, 20b the purpose of which will become clearer from the following.

Between the portions 8a and 8b there are three sections, two of which are indicated 23 whereas the third, which is interposed between the sections 23, is indicated 24. The sections 23 and 24 and the portions 8a and 8b are connected to one another by thin portions which constitute bending lines of the insert 7e.

In order to bring the insert 7e from the extended condition shown in FIG. 15 to the condition of use of FIG. 16, the portions 8a and 8b are placed side by side by bending of the respective bending lines between the sections 23 and 24 and the portions 8a and 8b. In use, the bending of the parts of the insert 7e takes place after the insert 7e has been placed in the region of a node at which an edge wire 3a and at least one arm 5a intersect. When the portions 8a and 8b are placed side by side, the semicircular seats 20a and 20b are arranged facing one another so as to define a cylindrical seat 20 of a shape corresponding to the end of one arm 5a or of a pair of arms 5a. In this condition, the section 24 adopts a position substantially parallel to the central section of the S-shaped portion 8a, and the sections 23 are inclined at about 45° to the section 24.

The portions 8a and 8b advantageously have mutual snap-connection means constituted, for example, by a pair of holes 21 in the vicinity of the free end of the portion 8a and corresponding pins 22 in the vicinity of the free end of the portion 8b, the pins 22 being able to engage the holes 21 with friction in order to hold the portions 8a and 8b together in the configuration shown in FIG. 16. Alternatively, the half-shells 8a and 8b may be connected to one another by other known connection means such as screw connection means.

Although the seat 20 shown in FIGS. 15 and 16 is shaped for housing a single arm 5a of a U-shaped transverse wire 5, the insert 7b may be shaped, according to need, for housing a pair of adjacent arms 5a of two U-shaped transverse wires 5, for example, of two adjacent sections of the tray 1, simply by correspondingly enlarging the seat 20.

FIGS. 17a, 17b, 17c and 18 show yet another insert variant, indicated 7f. The insert 7f may be formed by elements made of metal or of plastics material and is intended to perform a protection function in the region in which two adjacent sections of the tray 1 are joined. The insert 7f is associated with a joining member 25 of known type, shaped for housing the free ends of a pair of adjacent arms 5a of two U-shaped transverse wires 5 and comprises a channel-shaped element 26 which can extend around an axial portion of a longitudinal edge wire 3a.

The joining member 25 is formed by two separate portions formed as a pair of half-shells 25a, 25b which cooperate in facing positions to define a seat 20 for housing a pair of arms 5a disposed side by side. Each of the half-shells 25a and 25b has a pair of through-holes and the half-shells are connected to one another in their condition of use by respective nut-and-bolt assemblies 27 which clamp them together.

Figure 18:
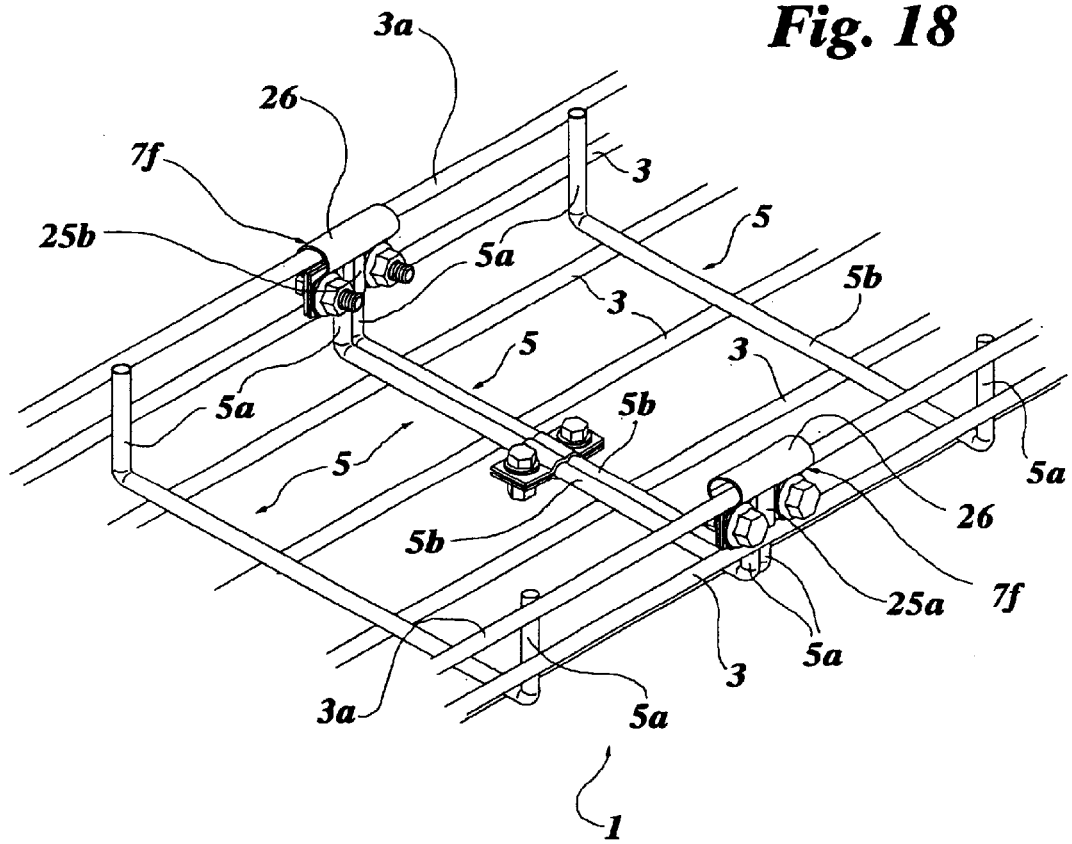
FIG. 18 is a perspective view which shows the insert of FIG. 17 in the mounted condition.

The channel-shaped element 26 is shaped so as to define a substantially cylindrical cavity 18 and comprises a pair of tabs 30 each of which has a slot through which the bolt of a corresponding nut-and-bolt assembly 27 can be inserted during the mounting of the insert 7f. The tab 30 can thus be interposed between the nut and the bolt of the nut-and-bolt assembly so that, upon completion of the mounting, the element 26 is connected to the joining member 25 and is held in position by the tightening of the nut-and-bolt assemblies 27 as shown in FIGS. 17c and 18.

Figure 19:
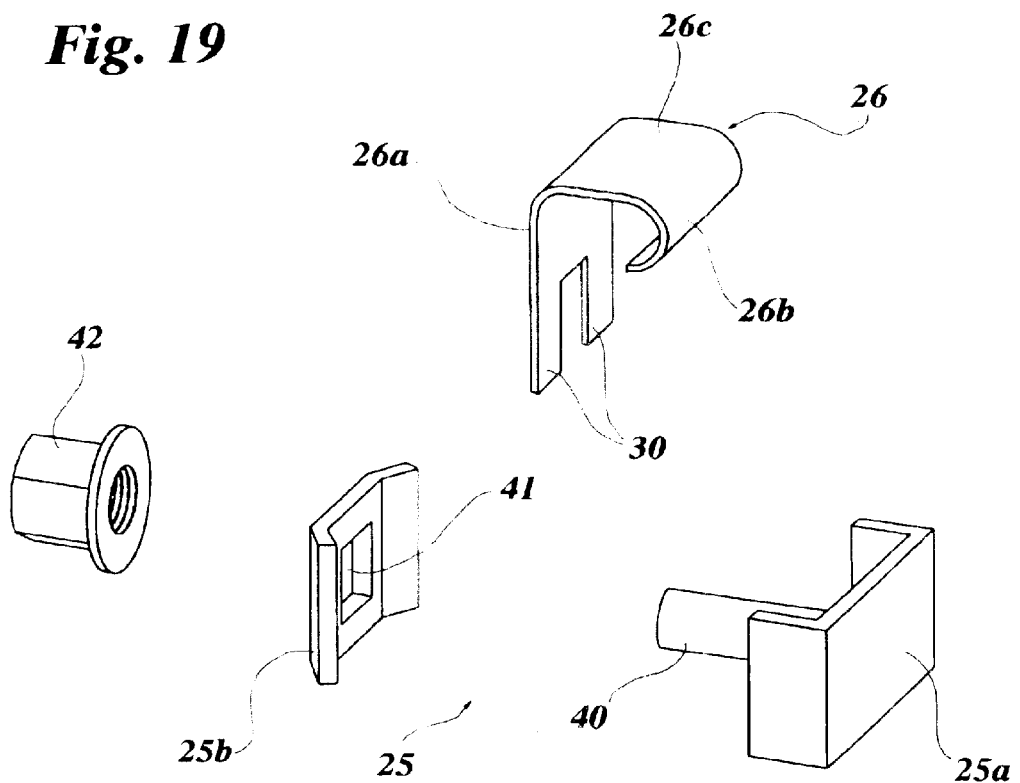
FIG. 19 is an exploded, perspective view of a further variant of the second embodiment of the invention.
Figure 20:
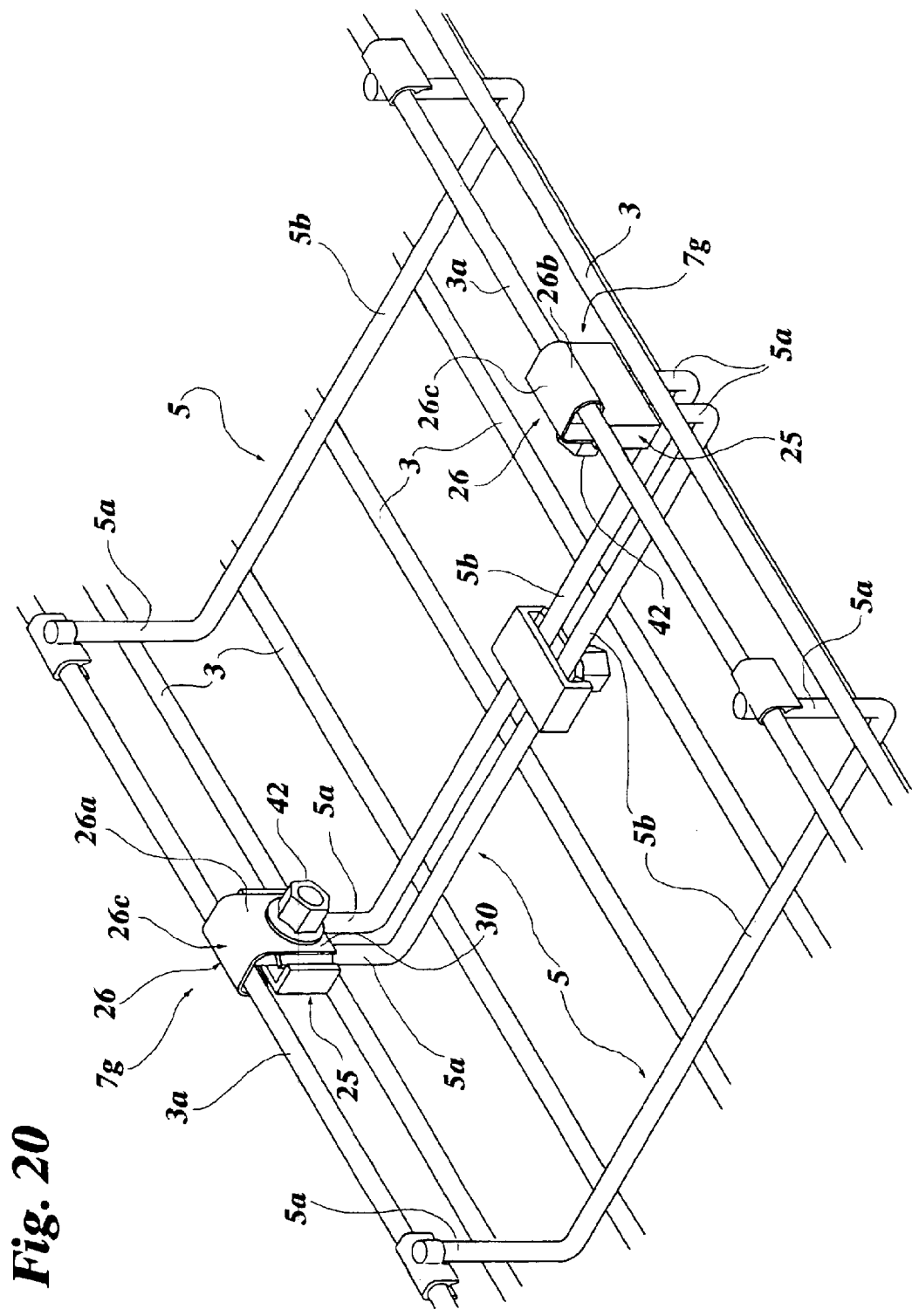
FIG. 20 is a perspective view which shows the insert of FIG. 19 in the mounted condition.

A further variant of the insert of the invention which is conceptually similar to the previous one is shown in FIGS. 19 and 20, in which it is indicated 7g. The insert 7g, which may also be formed by elements made of metal or of plastics material, is arranged in association with a joining member 25 formed by two half-shells 25a and 25b, in accordance with a known configuration, for joining two adjacent arms 5a of two U-shaped transverse wires 5 and includes a channel-shaped element 26 which, in the embodiment shown, comprises a flat base wall 26c and a pair of opposed bent flanges 26a and 26b.

A first half-shell 25a has, in a central position, a pin 40 which can extend through a corresponding through-hole 41 defined in the second half-shell 25b and can engage frictionally in a blind hole of a corresponding base element 42.

On the side having the flange 26a, the channel-shaped element 26 has a pair of flat appendages 30 which are disposed side by side and, upon coupling with the joining member 25, are arranged on opposite sides of the pin 40, enabling the element 26 to be held in position in the assembled condition as a result of the clamping of the pin in the corresponding base element 42.

Naturally, the principle of the invention remaining the same, the forms of embodiment and details of construction may be varied widely with respect to those described and illustrated purely by way of non-limiting example, without thereby departing from the scope of protection of the present invention defined by the appended claims.

What is claimed is:

1. A protection member for a cable tray which comprises a series of longitudinal wires and a series of transverse wires connected to one another at nodes to form a grid, in which each transverse wire includes a base portion from which two parallel arms extend transversely relative to the base portion so that each transverse wire is generally U-shaped, the series of longitudinal wires comprising a pair of longitudinal edge wires which are disposed beside free ends of the parallel arms of the U-shaped transverse wires, said member being arranged for being placed in the region of at least one of the nodes at which the longitudinal edge wires and the parallel arms of the U-shaped transverse wires of the tray intersect, in order to cover the free ends of the parallel arms and at least a portion of the longitudinal edge wire disposed beside said free ends, and said member comprising an elongate profiled body which can extend along the tray so as to be disposed over the ends of the parallel arms of one of the sides of the tray.

2. A protection member according to claim 1, wherein each profiled body is shaped in a manner such that it can be coupled with at least one longitudinal edge wire of the tray.

3. A protection member according to claim 2, wherein the profiled bodies are fixed to the longitudinal edge wires by electrical welding, the bodies being made of metal.

4. A protection member according to claim 2, wherein the profiled bodies are removable and can be fitted on the longitudinal edge wires by snap-retaining means, the bodies being made of plastics material or of metal.

5. A protection member according to claim 4, wherein the snap-retaining means are formed integrally with the respective profiled body and include a plurality of resiliently deformable clips.

6. A protection member according to claim 1, wherein each profiled body has axially spaced-apart regions of weakening for facilitating its separation into shorter sections.

7. A protection member according to claim 1, having a shaped outer surface for permitting the snap-engagement of a bent edge portion of a cover for closing the tray.

8. A protection member for a cable tray which comprises a series of longitudinal wires and a series of transverse wires connected to one another at nodes to form a grid, in which each transverse wire includes a base portion from which two parallel arms extend transversely relative to the base portion so that each transverse wire is generally U-shaped, the series of longitudinal wires comprising a pair of longitudinal edge wires which are disposed beside free ends of the parallel arms of the U-shaped transverse wires, said member being arranged for being placed in the region of at least one of the nodes at which the longitudinal edge wires and the parallel arms of the U-shaped transverse wires of the tray intersect, in order to cover the free ends of the parallel arms and at least a portion of the longitudinal edge wire disposed beside said free ends.

said member consisting of an insert which is arranged for being positioned in the region of a node at which at least one longitudinal edge wire and at least one arm of a U-shaped transverse wire intersect, and wherein each insert has a channel-shaped portion for extending around a portion of at least one longitudinal edge wire, and a seat which is arranged transversely relative to the channel-shaped portion and which can be engaged by at least one end of a U-shaped transverse wire.

9. A protection member according to claim 8, wherein each insert is removable and can be snap-fitted on at least one longitudinal edge wire.

10. A protection member according to claim 8, wherein each insert is made of metal and can be fixed to at least one longitudinal edge wire by electrical welding.

11. A protection member according to claim 8, having a shaped outer surface for permitting the snap-engagement of a bent edge portion of cover for closing the tray.

12. A protection member for a cable tray which comprises a series of longitudinal wires and a series of transverse wires connected to one another at nodes to form a grid, in which each transverse wire includes a base portion from which two parallel arms extend transversely relative to the base portion so that each transverse wire is generally U-shaped, the series of longitudinal wires comprising a pair of longitudinal edge wires which are disposed beside free ends of the parallel arms of the U-shaped transverse wires, said member being arranged for being placed in the region of at least one of the nodes at which the longitudinal edge wires and the parallel arms of the U-shaped transverse wires of the tray intersect, in order to cover the free ends of the parallel arms and at least a portion of the longitudinal edge wire disposed beside said free ends, said member consisting of an insert which is arranged for being positioned in the region of a node at which at least one longitudinal edge wire and at least one arm of a U-shaped transverse wire intersect, wherein each insert is produced as a result of blanking and bending operations performed on a metal plate so as to form a pair of opposed resilient clips.

13. A protection member for a cable tray which comprises a series of longitudinal wires and a series of transverse wires connected to one another at nodes to form a grid, in which each transverse wire includes a base portion from which two parallel arms extend transversely relative to the base portion so that each transverse wire is generally U-shaped, the series of longitudinal wires comprising a pair of longitudinal edge wires which are disposed beside free ends of the parallel arms of the U-shaped transverse wires.

said member being arranged for being placed in the region of at least one of the nodes at which the longitudinal edge wires and the parallel arms of the U-shaped transverse wires of the tray intersect, in order to cover the free ends of the parallel arms and at least a portion of the longitudinal edge wire disposed beside said free ends, said member consisting of an insert which is arranged for being positioned in the region of a node at which at least one longitudinal edge wire and at least one arm of a U-shaped transverse wire intersect, wherein each insert is produced by moulding of plastics material, wherein each insert includes a pair of half-shells connected in the region of a bending portion so that the insert can be fitted on at least one longitudinal edge wire as a result of deformation of the insert along a bending line of the bending portion and of mutual connection of the two half-shells.

14. A protection member according to claim 13, wherein the bending portion comprises a plurality of sections, a bending line being interposed between each pair of sections.

15. A protection member according to claim 13, wherein the half-shells can be connected to one another by screw coupling means.

16. A protection member according to claim 13, wherein the half-shells have mutual snap-connection means.

17. A protection member according to claim 13, having a shaped outer surface for permitting the snap-engagement of a bent edge portion of a cover for closing the tray.

18. A protection member for a cable tray which comprises a series of longitudinal wires and a series of transverse wires connected to one another at nodes to form a grid, in which each transverse wire includes a base portion from which two parallel arms extend transversely relative to the base portion so that each transverse wire is generally U-shaped, the series of longitudinal wires comprising a pair of longitudinal edge wires which are disposed beside free ends of the parallel arms of the U-shaped transverse wires, said member being arranged for being placed in the region of at least one of the nodes at which the longitudinal edge wires and the parallel arms of the U-shaved transverse wires of the tray intersect, in order to cover the free ends of the parallel arms and at least a portion of the longitudinal edge wire disposed beside said free ends, said member consisting of an insert which is arranged for being positioned in the region of a node at which at least one longitudinal edge wire and at least one arm of a U-shaped transverse wire intersect, wherein each insert can be associated with a joining member which is provided for housing and restraining a pair of transverse wires disposed side by side, and which comprises a pair of half-shell portions that can be coupled in facing positions by clamping means, and wherein the insert comprises a channel-shaped element connected to the member by the clamping means.

* * * * *